T. YAMASAKI.
ANIMAL TRAP.
APPLICATION FILED JAN. 16, 1922.
1,425,355.
Patented Aug. 8, 1922.
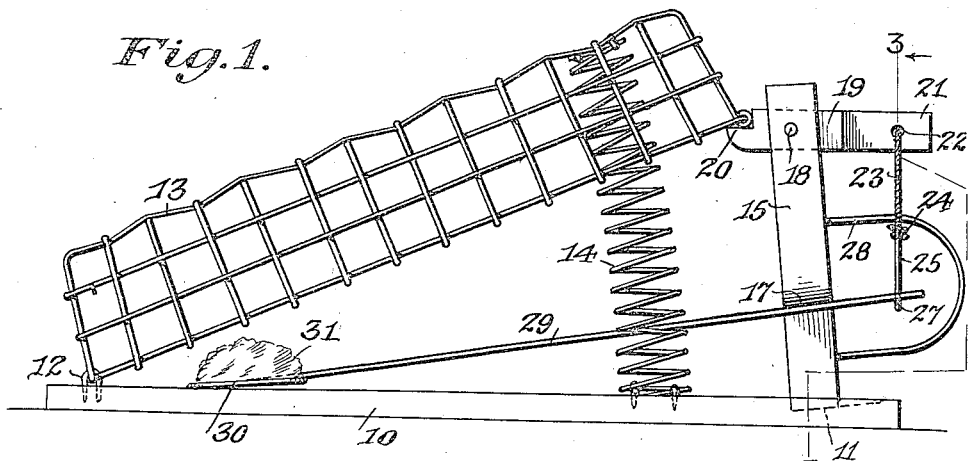
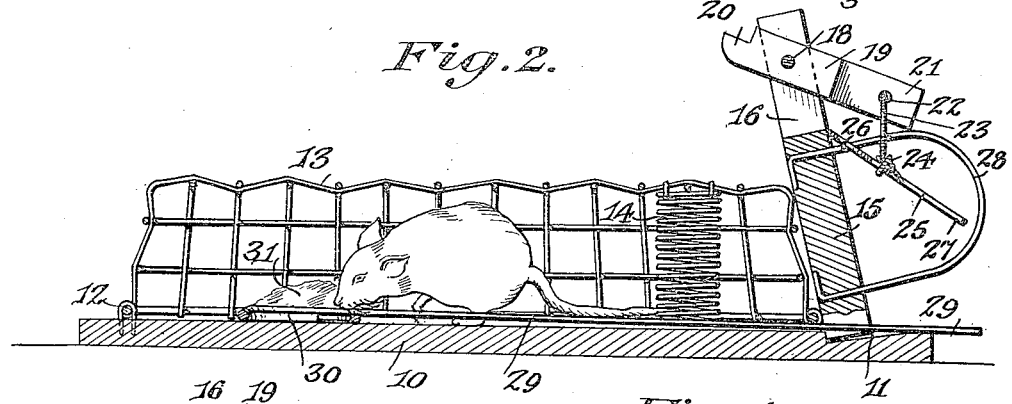
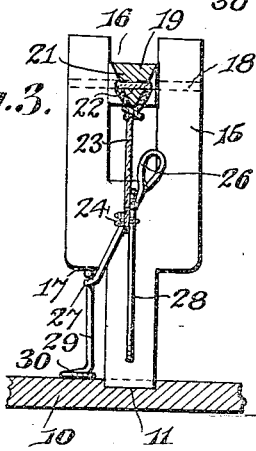
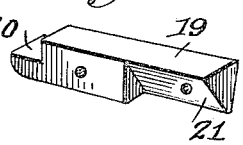
T. Yamasaki, INVENTOR.
BY Geo. P. Kimmel, ATTORNEY.

UNITED STATES PATENT OFFICE.

TSNNEJIRO YAMASAKI, OF SAN FRANCISCO, CALIFORNIA.

ANIMAL TRAP.

1,425,355.     Specification of Letters Patent.     Patented Aug. 8, 1922.

Application filed January 16, 1922. Serial No. 529,423.

*To all whom it may concern:*

Be it known that I, TSNNEJIRO YAMASAKI, a citizen of the United States, residing at San Francisco, in the county of San Francisco and State of California, have invented certain new and useful Improvements in Animal Traps, of which the following is a specification.

This invention relates to animal traps, and has for one of its objects to improve and simplify the construction and increase the efficiency and utility of devices of this character.

Another object of the invention is to provide a device of this character adapted to be constructed of any required size or material and adapted to trap animals of any size and species without material structural change.

With these and other objects in view the invention consists in certain novel features of construction as hereinafter shown and described and then specifically pointed out in the claims, and in the drawings illustrative of the preferred embodiment of the invention:—

Figure 1 is a side elevation of one of the improved traps in elevated or "set" position.

Fig. 2 is a longitudinal sectional elevation of the parts shown in Fig. 1 with the trap in closed or lowered position.

Fig. 3 is a transverse section on the line 3—3 of Fig. 1.

Fig. 4 is a detached perspective view of the latch member of the improved trap.

Fig. 5 is a plan view of the bait carrying element of the improved trap.

The improved device comprises a base member 10 which may be of wood or metal as preferred, and formed with an inclined recess or seat 11 near one end.

Hinged at 12 to the base at the end opposite to the seat 11, is a cage device represented as a whole at 13, preferably open wire work as shown, but may be of any of the other suitable materials.

The cage is thus free to swing vertically at its unhinged end to enable it to be disposed with its free end elevated as shown in Fig. 1, or bearing by its lower edge upon the base 10 as shown in Fig. 2.

When elevated as in Fig. 1 the animal to be trapped can pass beneath the cage and when the cage is disposed as in Fig. 2, the trapped animal cannot escape.

One or more springs 14 connect the cage to the base and operate to quickly close it when the animal springs the trigger mechanism and holds the cage closed against the efforts of the animal to escape.

Supported loosely by its lower end in the seat 11 is a standard device represented as a whole at 15, and divided at the upper end as at 16 and with one or more intermediate lateral stop shoulders 17.

Pivoted at 18 in the divided portion 16 is a latch member 19 having "toe" portion 20 at one end to extend beneath the lower edge of the cage 13 when the latter is elevated, as shown in Fig. 1, and with the other end preferably V shaped as shown at 21.

The lower end of the standard 16 is at right angles to its longitudinal axis, so that when disposed in the inclined seat 11 the standard leans at its upper end toward the cage, as shown in Fig. 1, so that when released it will fall toward the cage and be prevented thereby from falling, as hereinafter more fully explained.

Connected at one end at 22 to the V shaped portion of the latch member is a flexible member, such as a cord, 23 and connected at 24 at its other end to a trip member in the form of a rod 25 with an enlargement 26 at one end and curved slightly as at 27 at the other end.

Connected to the standard 15 is a stop member, for illustration in the form of a U shaped wire 28.

When the trap is to be "set," the cage 13 is elevated at its free end and engaged with the "toe" portion 20 of the latch member and the trip member 24 disposed beneath the stop 28 with the enlargement 26 at the side of the stop opposite to the flexible member 23. The bait carrying member, with the bait previously attached, is disposed beneath the lateral stop shoulder 17 and above the curved portion 27 of the trip member, as shown in Figs. 1 and 3. The cage will thus be supported in its upper or "set" position as shown in Fig. 1, and thereafter the slightest disturbance of the baited end of the rod 29, for instance by an animal in the effort to consume the bait, will disengage the rod from the trip and release the latch member and permit the springs 14 to quickly close the cage and trap the animal.

As before stated, the standard 15 being initially disposed in a leaning position toward the cage, when the trap is sprung and the standard released, it will naturally fall toward the cage and be prevented thereby from falling completely over, as illustrated in Fig. 2.

The improved device is simple in construction, can be inexpensively manufactured of any suitable material and of any size to adapt it for animals of different sizes and species.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus fully described the invention, what is claimed as new is:

1. An animal trap comprising a base support, a cage hinged at one end to the base, a standard bearing on the base and having a stop extending therefrom and an intermediate stop shoulder, a latch member pivoted intermediate the ends to the standard and adapted to engage the free end of the cage when elevated, a trip member adapted to engage the stop of the standard, means for movably coupling the trip member to the latch member, and a bait carrying member bearing beneath said stop shoulder and engaged by the free end of the trip member.

2. An animal trap comprising a base support having an inclined seat near one end, a cage hinged to the base at the end opposite to the seat, a standard bearing in the seat of the base and having a stop extending therefrom and an intermediate lateral stop shoulder, a latch member pivoted intermediate the ends to the standard and adapted to engage the free end of the cage when elevated, a trip member adapted to engage the stop of the standard, means for movably coupling the trip member to the latch member, and a bait carrying member bearing beneath said stop shoulder and engaged by the free end of the trip member.

In testimony whereof, I affix my signature hereto.

TSNNEJIRO YAMASAKI.